United States Patent
Gorman et al.

(10) Patent No.: US 8,750,884 B1
(45) Date of Patent: Jun. 10, 2014

(54) CALL ROUTING USING DOMAIN NAME SERVICE AND ELECTRONIC NUMBER MAPPING

(75) Inventors: Pierce Gorman, Lee's Summit, MO (US); Hal S. Beech, Olathe, KS (US); Nicolas A. Nehme-Antoun, Olathe, KS (US); Trey Allen Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 13 days.

(21) Appl. No.: 13/603,742

(22) Filed: Sep. 5, 2012

(51) Int. Cl.
*H04W 40/00* (2009.01)

(52) U.S. Cl.
USPC .......................................... 455/445; 370/352

(58) Field of Classification Search
USPC .............................. 455/445; 370/352; 379/350
See application file for complete search history.

(56) References Cited

U.S. PATENT DOCUMENTS

| 7,133,506 | B1* | 11/2006 | Smith | 379/88.25 |
| 2007/0104184 | A1* | 5/2007 | Ku et al. | 370/352 |
| 2007/0121908 | A1* | 5/2007 | Benedyk et al. | 379/350 |
| 2010/0157986 | A1* | 6/2010 | Rao et al. | 370/352 |

* cited by examiner

*Primary Examiner* — Jinsong Hu
*Assistant Examiner* — Nathan Taylor

(57) ABSTRACT

Methods and systems for routing mobile device calls, based on a converted telephone number of a mobile device, location information of the mobile device, and trunk group identifiers. A query requesting one or more routes for a mobile device call is generated. The query includes a converted telephone number of the mobile device and location information of the mobile device. One or more responses identifying one or more routes for the mobile device call are received from a centralized routing function. The one or more responses each include an originating trunk group identifier. The originating trunk group identifier includes an egress trunk group. Upon receiving the one or more responses, the mobile device call is routed using an outbound trunk group of a response from the centralized routing function.

20 Claims, 5 Drawing Sheets

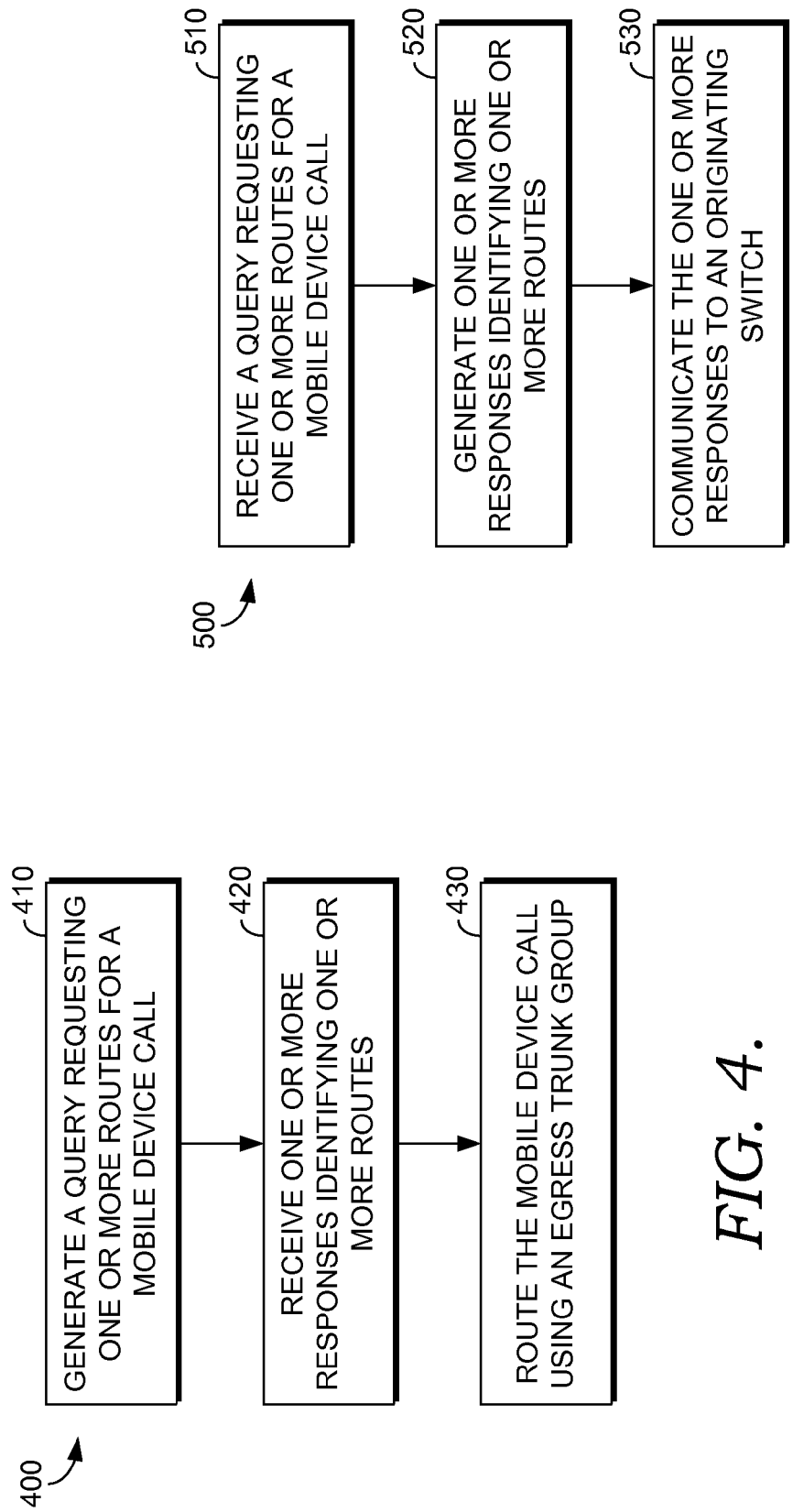

CALL ROUTING USING DOMAIN NAME SERVICE AND ELECTRONIC NUMBER MAPPING

SUMMARY

A high-level overview of the invention is provided here to disclose and to introduce a selection of concepts that are further described below in the detailed description section. This summary is neither intended to identify key features or essential features of the claimed subject matter, nor is it intended to be used as an aid in isolation to determine the scope of the claimed subject matter.

In brief and at a high level, this disclosure describes, among other things, methods and systems for routing calls from a mobile device based on a converted telephone number of a mobile device, location information of the mobile device, and trunk group identifiers. In particular, the present invention provides routing local and long-distance calls from a mobile device, associated with a wireless communications network, based on a query-response methodology and a centralized routing function that uses the converted telephone number and the location information of the mobile device to provide trunk group identifiers to route the calls. The wireless communication network may be associated with a plurality of switches (e.g., Mobile Switching Centers, Media Gateway Controller or Media Gateway combination softswitches) and the central routing function, that together provide call routing for the mobile device. A switch generates a query requesting one or more routes for a mobile device call. The query comprises a converted telephone number of the mobile device and location information of the mobile device. The switch receives one or more responses from a centralized routing function, the one or more responses identifying the one or more routes for the mobile device call. The one or more responses each comprise an originating trunk group identifier; the originating trunk group identifier comprises an egress trunk group. The switch routes the mobile device call using an egress trunk group of a response from the centralized routing function.

BRIEF DESCRIPTION OF THE SEVERAL VIEWS OF THE DRAWINGS

Illustrative embodiments of the present invention are described in detail below with reference to the attached drawing figures, and wherein:

FIG. 4 depicts a flowchart illustrating a method for routing calls from a mobile device based on a converted telephone number of the mobile device, location information of the mobile device, and trunk group identifiers, in accordance with an embodiment of the present invention; and FIG. 5 depicts a flowchart illustrating a method for routing calls from a mobile device based on a converted telephone number of the mobile device, location information of the mobile device, and trunk group identifiers, in accordance with an embodiment of the present invention.

DETAILED DESCRIPTION

Figure 1:
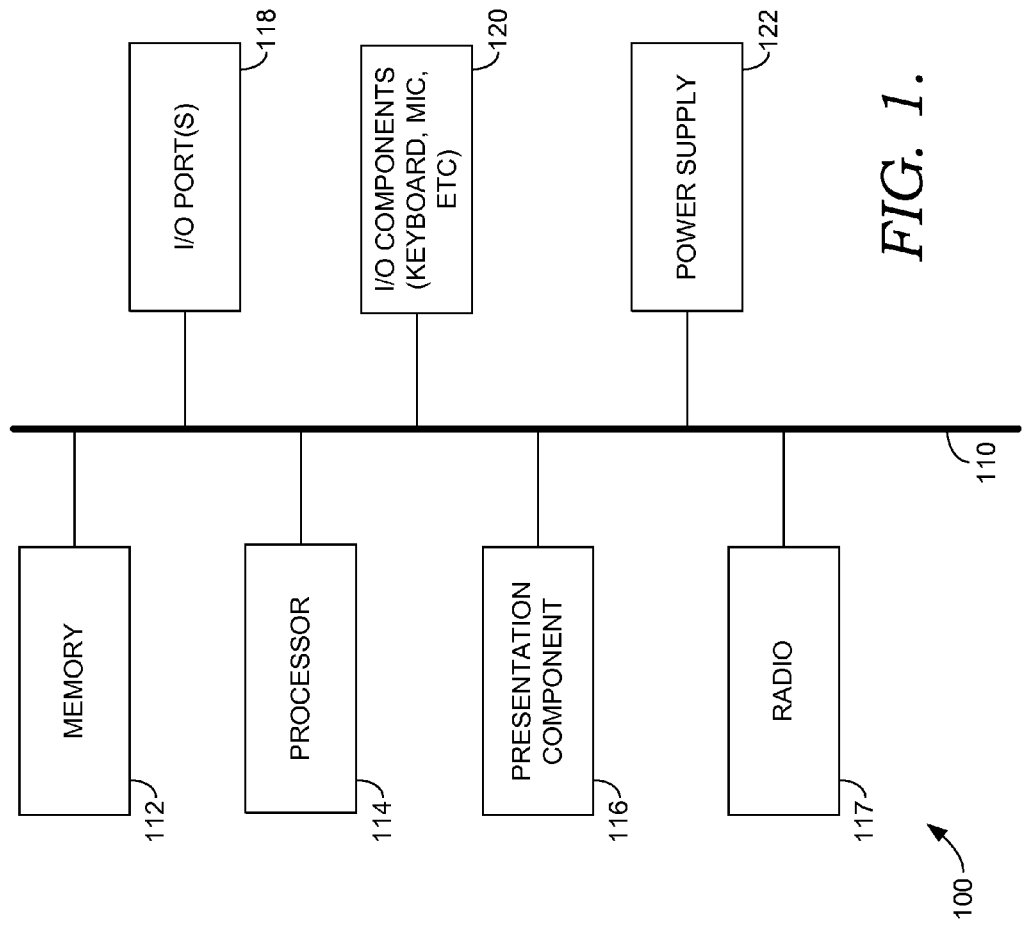
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

AAA Authentication, Authorization, and Accounting
ABNF Augmented Backus Naur Form
B2BUA Back-to-Back User Agent
BTS Base Transceiver Station
CDMA Code Division Multiple Access
DDDS Dynamic Delegation Discovery System
DNS Domain Name Service
EDNSO Extension Mechanism for DNS
ENUM Electronic Number Mapping
FA Foreign Agent
FQDN Fully Qualified Domain Name
GGSN GPRS Gateway Support Node
GPRS General Packet Radio Service
GSM Global System for Mobile communications (Groupe Spécial Mobile)
HA Home Agent
HTTP Hypertext Transfer Protocol
IP Internet Protocol
LED Light Emitting Diode
LTE Long Term Evolution
NAPTR Name Authority Pointer
MDN Mobile Device Number
MG Media Gateway
MGC Media Gateway Controller
MSC Mobile Switching Center
MSCID Mobile Switching Center Identification
PDA Personal Data Assistant
PDSN Packet Data Serving Node
PSTN Public Switched Telephone Network
RegEx Regular Expression
RFC Requests For Comments
RNC Radio Network Controller
RR Resource Record
SDP Session Description Protocol
SIP Session Initiation Protocol
SMS Short Messaging Service
TDMA Time Division Multiple Access
UMTS Universal Mobile Telecommunications System
URI Uniform Resource Identifiers Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As mentioned, embodiments of the present invention are directed toward routing calls from a mobile device based on a converted telephone number of the mobile device, location information of the mobile device, and trunk group identifiers. In particular, the present invention provides routing local and long-distance calls from a converted telephone number of a mobile device, associated with a wireless communications network, based on a query-response methodology and a centralized routing function that uses the location information of the mobile device to provide trunk group identifiers to route the calls. Call routing in the Public Switched Telephone Network (PSTN) is accomplished by routing calls over specific circuits (commonly referred to as "trunks") between Time Division Multiplexed (TDM) circuit switches. In switches, a group of trunks that connect to the same target switch or network is called a trunk group. Consequently, trunk groups have labels, which are used as the main indication for the previous and next TDM switch participating in routing the call.

Trunk groups may also be based on SIP. SIP trunking is a Voice over Internet Protocol and streaming media service based on the Session Initiation Protocol, by which Internet telephone service providers (ITSPs) deliver telephone service and unified communications to customers equipped with SIP-based private branch exchange (IP-PBX) and Unified Communications facilities. SIP trunking includes SIP trunk groups for SIP signaling for originating, forwarding, or terminating SIP sessions. Configuration, operation, and management of SIP trunk groups may be based on different conceptual models (e.g., RFC 4904 "Representing Trunk Groups in tel or sip Uniform Resource Identifiers, hereinafter "RFC 4904"). A SIP trunk group includes a single line between two SIP elements also referred to as a point-to-point trunk group. An SIP trunk also includes a point-to-multipoint SIP trunk group, which could either be IP address-based or IP address, and port-based. Point-to-multipoint SIP trunk groups can be combined with virtual trunk groups to provide parallel trunk groups between switches. Communicating between SIP elements through trunk groups is done using a SIP protocol. For example, SIP messages (e.g. SIP INVITE) may include information containing a virtual trunk group identifier. The SIP protocol is extensible and allows for proprietary headers to be introduced into the protocol. Extensible identifiers may be associated with a unique identifier to delineate the header as extended or experimental.

Embodiments of the present invention provide an efficient and simple method for a switch to route calls associated with a wireless communications network (e.g., CDMA, GSM, and TDMA) by providing a converted telephone number and location information of a mobile device using a query-response methodology with a centralized routing function that provides originating and terminating trunk groups identifiers for call routing. Currently, mobile device call routing based on converted telephone numbers (e.g., ENUM) is insufficient for more complex routing requirements where routing decisions could also be based on location or namespace information about the calling party. In this regard, routing does not include, for example, jurisdictionalization, i.e., routing decisions based on both the calling number and the called number. Thus, whether a call is local, long distance, or from a different subscriber is not factored into routing decisions. Further, embodiments of the present invention also provide improvements for least cost routing. A least cost routing strategy includes identifying the best possible routes from an originating switch to a terminating switch or a tandem switch. Presently, originating and terminating trunk groups are not properly defined in an ENUM query-response methodology to support routing from an originating switch or a next hop tandem switch. As such, a switch may use the query-response methodology with a centralized routing function to route mobile device calls based on a converted telephone number of a mobile device, location information of the mobile device, and trunk group identifiers.

Accordingly, in a first aspect of the present invention, computer-readable media having computer-executable instructions embodied thereon that, when executed, enable a computing device to perform a method of routing mobile device calls based on a converted telephone number of a mobile device, location information of the mobile device, and trunk group identifiers. The method includes generating a query requesting one or more routes for a mobile device call. The query comprises a converted telephone number of the mobile device and location information of the mobile device. The method further includes receiving one or more responses from a centralized routing function. The one or more responses identify the one or more routes for the mobile device call. The one or more responses each comprise an originating trunk group identifier. The originating trunk group identifier includes an egress trunk group. The method also includes, upon receiving the one or more responses, routing the mobile device call using an egress trunk group of a response from the centralized routing function.

In a second aspect of the present invention, computer-readable media having computer-executable instructions embodied thereon that, when executed, enable a computing device to perform a method of routing mobile device calls based on a converted telephone number of a mobile device, location information of the mobile device, and trunk group identifiers. The method includes receiving a query requesting one or more routes for a mobile device call. The query comprises a converted telephone number of the mobile device and location information of the mobile device. The method also includes, in response to the query, generating one or more responses identifying the one or more routes for the mobile device call. The one or more responses each comprise an originating trunk group identifier. The originating trunk group identifier includes an egress trunk group. The method further includes communicating the one or more responses to an originating switch for routing the mobile device call.

In a third aspect of the present invention, a system is provided for routing mobile device calls based on a converted telephone number of a mobile device, location information of the mobile device, and trunk group identifiers. The system includes an originating switch configured for generating a query requesting one or more routes for a mobile device call. The query comprises a converted telephone number of the mobile device and location information of the mobile device. The originating switch also receives one or more responses identifying the one or more routes for the mobile device call. The one or more responses each comprise an originating trunk group identifier. The originating trunk group identifier includes an egress trunk group. The originating switch further, upon receiving the one or more responses, routes the mobile device call using an egress trunk group of a response. The system further includes a centralized routing function configured for receiving a query requesting one or more routes for a mobile device call. The query comprises a converted telephone number of the mobile device and location information of the mobile device. The centralized routing function further, in response to the query, generates one or more responses identifying the one or more routes for the mobile device call. The one or more responses each comprise an originating trunk group identifier, wherein the originating trunk group identifier includes an egress trunk group. The centralized routing function also communicates the one or more responses to the originating switch for routing the mobile device call.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
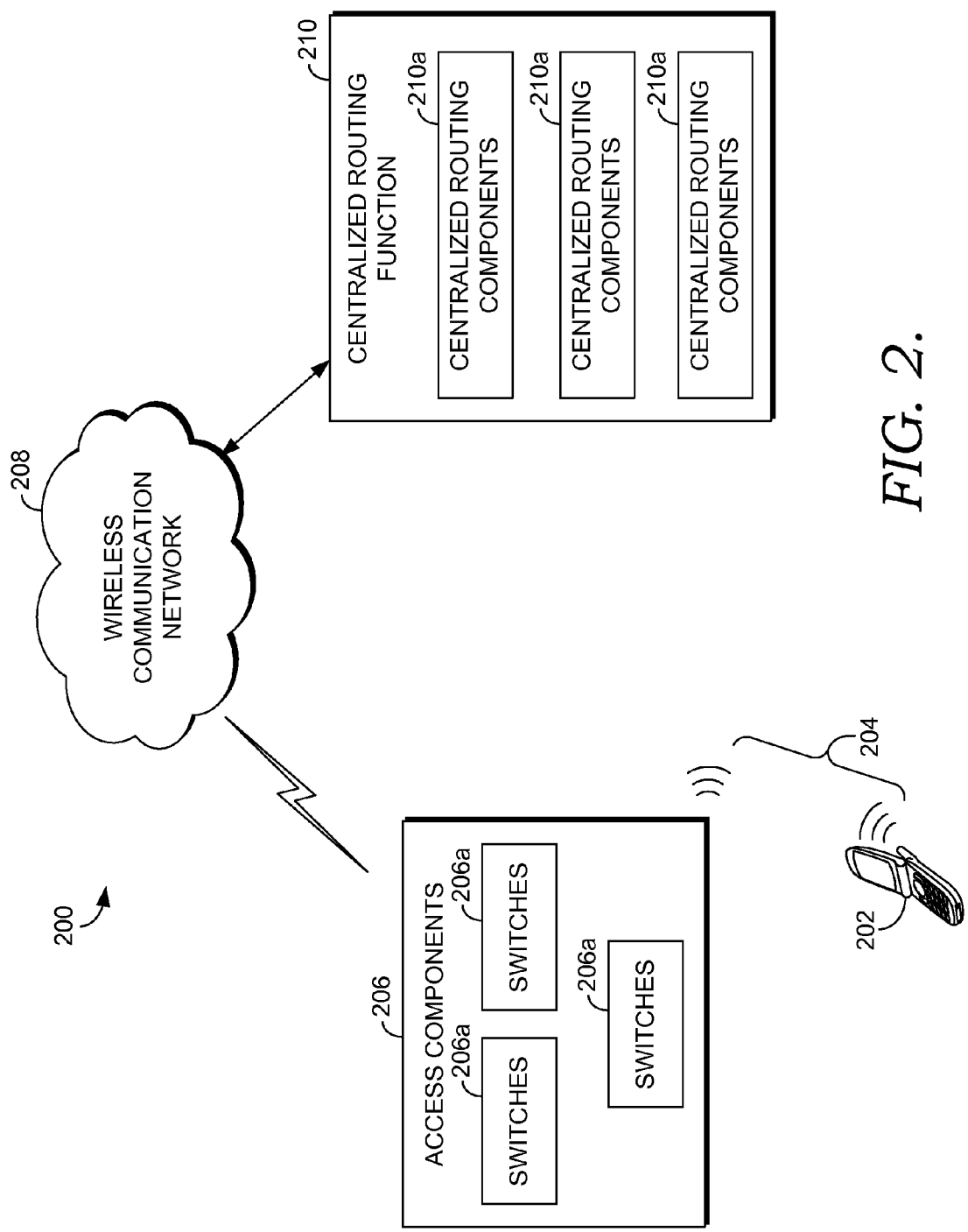
FIG. 2 depicts an illustrative operating system for carrying out embodiments of the present invention.

FIG. 2 depicts an illustrative operating environment, referenced generally by the numeral 200, and illustrates an operating environment that enables routing mobile device calls based on a converted telephone number of a mobile device (e.g., mobile device 202), location information of the mobile device, and trunk group identifiers. The operating environment 202 includes a mobile device 202, access components 206, a plurality of switches 206a, a wireless communication network 208, and a centralized routing function 210 and a plurality of centralized routing components 210a. Mobile device 202, in one embodiment, is the type of device described in connection with FIG. 1 herein. Mobile device 202 may make and receive telephone calls over a radio link while moving around wide geographic areas. The telephone call may be international, local, or long-distance. In addition to telephony, mobile device 202 may support a wide variety of other services (e.g., text messaging, MMS, e-mail, internet access, short-range wireless communication, applications, and gaming). Calls from mobile device 202 may be received at access components 206 and routed wireless communication network 208, potentially owned by different telephone carriers.

Each time a call is placed for routing, the destination number (also known as the Called Party) may be entered by the calling party into the terminal of the calling party. The destination number generally has two parts, a prefix which generally identifies the geographical location of the destination telephone, and a number unique within that prefix that determines the specific destination terminal. Sometimes, if the call is between two terminals in the same local area, then the prefix may be omitted. When a call is received at a switch, the call may be routed using several alternative routes based on the destination of the call. In one embodiment, each time the mobile device 202 places a call for routing, the call is also routed based on location or namespace information for the calling party. Location or namespace information may include information such as a CallingPartyNumber (CgPN), an MSCID, a cell location, and a sector location. By way of illustration, location or namespace information may be sent from mobile device 202 to the wireless communication network 208 and/or access components 206 to provide information for routing the mobile device call. A more complex routing requirement is met and more complex routing decision-making may be accomplished with location or namespace information.

Mobile device 202 communicates with access components 206 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GPRS, GSM, TDMA, LTE, and 802.16.

Generally, the access components 206 provide access to what some skilled artisans refer to as a wireless communications network 208, also termed a core network. A wireless communications network 208 may comprise one or more of the components illustrated in FIG. 2. To the contrary, not all components that make up a wireless communications network are shown. Also, not all connections or possible connections are shown. The access components 206 may be one or more of a base transceiver station (BTS), a Wi-Fi router, a mobile hotspot, a switch and any other device that facilitates communication between mobile device 202 and network 208. In one embodiment, the access components 206 includes both a Wi-Fi router and a BTS tower. In another embodiment, access components 206 may be BTS towers. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

As mentioned, some components are not depicted in FIG. 2 so as to not obscure aspects of the various embodiments of the present invention. For instance, the wireless communications network 208 may include various components that are not shown. One of these components is a network-access gateway (not shown) that helps facilitate communication between the mobile device 202 and other networks (not shown) as well as the Internet (not shown). The network-access gateway is also known by some skilled artisans as a packet data serving node (PDSN). Similarly, others might refer to this device as a foreign agent. The network-access gateway helps manage communications sessions between the mobile device 202 and other components. Any device that provides similar functionality is contemplated within the scope of this disclosure. For example, a GSM offers similar functionality in networks that utilize GSM or UMTS technology. Generally, in this disclosure, when we speak of communicating data or information we are referring to any action that requires mobile device 202 to have an IP address to carry out some action. Mobile device 202 might attempt to access items such as the Internet as well as other components that might alone or in combination facilitate things such as television reception, e-mail reception, picture mail, video mail, video conferencing, and the like.

In embodiments of the present invention, access components 206 include a plurality of switches 206a. A switch is a system of electronic components that connects telephone calls by routing placed telephone calls. For example, a switch may be a digital switch that works by connecting digital circuits together, according to a dialed telephone number. Calls may be set up between switches using protocols (e.g., SIP and Signaling System 7). The plurality of switches 206a are associated with wireless communication network 208, the wireless communication network 208 may be associated with Class 5 telephone switches, such as subscriber switches, which manage connections from subscriber telephones or Class 4 telephone switches designed to connect calls to other switches. For example, a tandem switch is used to connect two other switches (e.g., an originating switch and a terminal switch) to each other via one or more trunks. In this regard, each of the plurality of switches 206a may act as an originating switch, intermediate switch (or tandem switch) or a terminal switch, and the trunks may be part of a series of switches and lines that connect callers to each other.

In embodiments of the present invention, the plurality of switches 206a may be used to route calls from the mobile device 202 based on a converted telephone number of a mobile device, location information of the mobile device, and trunk group identifiers. Specifically routing local and long-distance calls from a mobile device, associated with a wireless communications network, based on a query-response methodology and a centralized routing function that uses the converted telephone number and the location information of the mobile device 202 to provide trunk group identifiers to route the calls. A switch may generate a query requesting one or more routes for a mobile device call. The switch generated query may include a converted telephone number of the mobile device and location information of the mobile device 202. The query may be a NAPTR RR query using converted telephone numbers. Call routing may be based on the converted telephone numbers (ENUM DNS) queries. Telephone numbers are converted to a DNS FQDN from ITU E.164 format using conversion protocols (e.g., RFC 2916 E.164 Number and DNS, hereinafter "RFC 2916" and RFC 3761 The E.16 to Uniform Resource Identifiers Dynamic Delegation Discovery System Application, hereinafter "RFC 3761"). E.164 is an ITU-T recommendation that defines the international public telecommunication numbering plan used in the PSTN and some other data networks. It also defines the format of telephone numbers; E.164 numbers can have a maximum of fifteen digits and are usually written with a "+" prefix.

The query-response "transaction" could involve multiple iterative DNS NAPTR RR queries and responses as defined within the DNS protocol for NAPTR RRs. The query with NAPTR RR is not only sufficient to discover the service and IP address associated with an E.164 telephone number; however, with additional location or namespace information about a Calling Party, in a query sent to a centralized routing function, the centralized routing function can generate more optimized routing responses. In this regard, the NAPTR RR query may be extended to accommodate additional information, for example, adding an OPT RR to the ENUM DNS NAPTR RR query, using an extension protocol (e.g., RFC 2671 Extension Mechanism for DNS (EDNSO) hereinafter "RFC 2671") to include location information (e.g., Calling-PartyNumber information found in a SIP "From:" header of a SIP INVITE, and MSCID, cell, and sector location information found in a SIP "P-Access-Network-Info:" header).

The plurality of switches 206a may send the query to a centralized routing function (e.g., centralized routing function 210) for one or more responses identifying the one or more routes for the mobile device call and also may receive one or more responses identifying the one or more routes for the mobile device call. The plurality of switches 206a further may provide support for originating and terminating trunk group identifiers included in the one or more responses from the centralized routing function 210. The one or more responses may be a DNS NAPTR RR response. Each response may include an E164 to URI SIP and TEL service identifiers and Regular Expression replacement instructions to identify routes. Several services may be associated with a converted telephone number using URI, for example, SMTP (e-mail), SMPP (text), HTTP (web), TEL (telephony), SIP (sessions). The routes may be SIP or legacy TDM routes. The routes are encoded in the URI produced by the Regular Expression replacement as virtual trunk group identifiers using a protocol for representing trunk groups in tel/sip URIs (e.g., RFC 4904).

The trunk group identifiers may include only originating trunk groups and trunk context fields or both originating and terminating trunk groups and trunk context fields. Both types of trunk groups are encoded using a ";tgrp=" user parameter specifying the trunk group, and a ";trunk-context=" user parameter identifying an administrative domain which is specified using all or some portion of the leading digits of an E.164 telephone number, or a DNS FQDN. The originating trunk group identifiers of a response from a centralized routing function identifies an egress trunk group on a switch. It is also contemplated that the originating trunk group identifier may also provide a virtual trunk group identifier information element to the destination switch (e.g. SIP INVITE), discussed below. By way of illustration, an originating trunk group in a response may be the SIP "CONTACT:" header is embedded in the Request URI of a NAPTR RR response 322 within an "E2U+PSTN:SIP" service identifier. The embedded SIP "CONTACT:" header contains ";tgrp=" and ";trunk-context=" user parameters used to specify the egress trunk group for that particular NAPTR RR response. The embedded SIP "CONTACT:" header is separated from the SIP using "?" character separation in the NAPTR RR response Regular Expression replacement.

In addition, an originating switch may not have to generate or replace the "CONTACT:" header of the formulated egress SIP INVITE (e.g., SIP INVITE 324) with the contents of the "CONTACT:" header returned in the NAPTR RR response. Using the "CONTACT:" header embedded with the originating trunk group provides a format for utilizing an originating trunk group identifier to identify egress trunk groups in a NAPTR RR response to a switch ENUM DNS query request using DNS NAPTR RRs. As discussed, information elements in a NAPTR RR response may be tagged to identify virtual trunk group identifiers and the originating switch may interpret the tagged information elements to know how to forward a mobile device call. Further, A NAPTR RR response from a centralized routing function may also be a TEL URI which will include an egress trunk group ";tgrp=" and ";trunk-context=" parameters and those trunk group identifiers are to be treated the same as originating trunk group identifiers in an embedded CONTACT header of a SIP URI in a NAPTR RR response and therefore used to select the egress trunk group.

In operation, the plurality of switches 206a may route telephone calls based on local interpretation of an egress virtual trunk group identifier. An originating switch, a switch that first receives the mobile device call, using the converted telephone number (e.g., ENUM) query-response method may be configured to locally interpret a list of NAPTR RR responses containing a mixture of legacy TDM routes which are represented using TEL URI+trunk group identifiers and SIP-based routes which are represented using SIP URI+trunk group identifiers. The trunk group identifiers may be appended based on a given protocol (e.g., RFC 4909). By way of illustration, the switch may maintain a local table of (SIP and TDM) trunk groups which also contains references for their corresponding egress trunk group identifiers. The egress trunk groups can be validly returned from a centralized routing function to the switch in ENUM DNS NAPTR RR responses. Upon receiving an ENUM DNS NAPTR RR response containing valid egress trunk groups, the switch searches its local table trunk groups to find a match. When a match is found, the switch forwards the call out through the matching trunk group using NAPTR order and preference. In particular, to find a match, the plurality of switches 206a may have a configurable data object which is, or is functionally equivalent to, trunk-context. The trunk-context data object can be global or configured on a per trunk group basis. In operation, the switch checks for a match between the locally configured trunk-context and the trunk-context of an egress trunk group specified using originating trunk group identifiers in an embedded SIP "CONTACT:" header of an ENUM DNS NAPTR RR response. If there is no match between the locally configured trunk-context and the trunk-context of the NAPTR RR response, the switch issues an alarm, and continues processing with the next available NAPTR RR response. In the event of a trunk context mismatch fault, the switch ignores the value of the ";tgrp=" trunk group identifier.

It is contemplated that the local table of trunk groups may include a flag for each of the SIP-based trunk groups which tells the switch whether or not to include egress trunk ";tgrp=" and ";trunk-context" user parameters in the SIP "CONTACT:" header formed during construction of the SIP INVITE used to originate the session. The flag controls whether or not the next hop switch will receive virtual trunk group information elements (e.g., originating trunk group identifiers in the INVITE CONTACT header) which tells the next hop switch the SIP trunk the call arrived on.

Support for terminating trunk groups may depend on whether the optional terminating trunk group identifiers are included in a response to the switch. If terminating trunk group identifiers are included in the Regular Expression replacement string of a DNS NAPTR RR response to an ENUM query, the switch does not route using the terminating trunk group identifiers to select an egress route, but instead constructs a Request URI using the terminating trunk group identifiers which will then be used by the next-hop (e.g., a tandem switch) as the egress route when forwarding the call. In addition, terminating trunk group identifiers on SIP proxies, B2BUAs, or softswitches may be supported based on a configuration of each individual switch. Softswitch support for terminating trunk group identifiers may include compliance with SIP protocols (e.g. RFC 3261 SIP: Session Initiation Protocol, hereinafter "SIP") including the ability to ignore terminating trunk group identifiers. For example, SIP servers that do not act on terminating trunk group identifiers may be configured to selectively interpret terminating trunk group identifiers based on some authorizing and authenticating information such as ingress trunk group, contact IP address, P-Asserted-Identity host domain, or other source association. In this regard, the switch or SIP server does not blindly attempt to forward calls to an egress trunk group based simply on the presence of terminating trunk group identifiers in the Request URI of an arriving SIP INVITE.

In embodiments, the plurality of switches 206a may be configured to act as next-hop tandem switches. The switch may have support for a protocol (e.g., RFC 4904) in order to receive a SIP Request URI for a terminating trunk group identifier for a particular egress trunk group. In operation, the SIP server checks for a match between the locally configured trunk-context and the trunk-context of the egress terminating trunk group. If there is not a match between the locally configured trunk-context and the trunk-context of the terminating trunk group, the switch issues and alarm, and continues with a default process (e.g., route to Class 4, or perform digit analysis).

The plurality of switches 206a may be configured such that ";tgrp=" and ";trunk-context=" user parameters are used together. If the ";trunk-context=" parameter is missing, a switch ignores the value of the ";tgrp=" trunk group identifier. The switch issues an alarm (e.g., invalid trunk syntax) for bad identifiers in a Request URI (if acting as a tandem or proxy) or CONTACT of a NAPTR RR response (if acting as an originating switch) and includes the URI that caused the error in the fault message, and continues processing either the next NAPTR RR response (if originating switch) or if acting as a tandem switch, the switch continues with a default process (e.g., route to Class 4, or perform digit analysis).

It is further contemplated that if there are valid egress trunk group identifiers in the DNS ENUM NAPTR RR responses, those identifiers take precedence over SIP SRV RR and A RR processing. As discussed, if the trunk group identifiers are not valid, the switch should issue and alarm and continue processing with the next available NAPTR RR response. If there are no egress trunk group identifiers in the DNS ENUM NAPTR RR responses, then the normal SIP processing methodology applies (e.g., local configuration or DNS SVRR and A RR query-response).

With continued reference to FIG. 2, the centralized routing function 210 is a collection of platforms (e.g., centralized routing component 210a) which provide mobile device call routing. For example, the centralized routing function 210 may provide SIP Look-Up and Location Routing Functions (LUF/LRF). The centralized routing function 210 may also include a plurality of centralized routing components, for example, a legacy long-distance Service Control Point running the Centralized Translations Control long-distance routing database and application, and a suite of switch Call Detail Record analysis and route optimization products (e.g., The Employee Owned Company—Sonar and Acuite).

The centralized routing function 210 collection of signaling and database platforms uses information from network trunk audits and rate management application to develop optimized long-distance call routing plans. A centralized routing function, with location and namespace information of the calling party, uses models of the least cost route for a network, to provide information on how to route calls from the originating switch and optionally from the next hop tandem switch. In operation, the central routing function 210 supports SIP trunk group based routing (e.g., RFC 4904) using an optimized routing engine (e.g., The Employee Owned Company—Acuite, Transactional IP Telephony Addressing and Numbering). The centralized routing function 210 may also use a converted telephone number (e.g., ENUM) query-response methodology. The query-response methodology includes ENUM query-response transactions that involve multiple iterative DNS NAPTR RR queries and responses as defined with the DNS protocol for NAPTR RRs.

Centralized routing components 210a are responsible for managing various applications, services, etc., that are used to route mobile device calls. By way of example, a central routing database (not shown) may communicate with the plurality of switches 206a and the centralized routing database will find the egress route choices based on least cost routing analysis and route optimization. The centralized routing database may have all the routing data, number breakouts, routing logic, and instant updates with daily rate changes with carriers and suppliers, carrier information, and commercial arrangement to perform the best routing. The centralized routing database may connect to other centralized routing function components 210a or even external systems (not shown) to get more information (e.g., number portability correction, destination group data, or other data) if required. For example, the centralized routing database may also contain Local Number Portability (LNP) corrected information or perform query on behalf of the switch. The result of an LNP query may be turned in ;RN= and NPDI= parameters of the URI contained in the NAPTR RR response. In cases where the ;RN= parameter contains a Routing Number, the switch does not route a mobile device call based on that value, but instead strictly adheres to the egress route contained in the originating virtual trunk group identifiers in the ENUM NAPTR RR response. A response from the centralized routing function pointing to an On-Net "neighbor: switch is presumed to be the CalledPartyNumber home switch, thus no other process is required on the part of the CRF to determine what switch the subscriber is registered to or visiting.

Figure 3A:
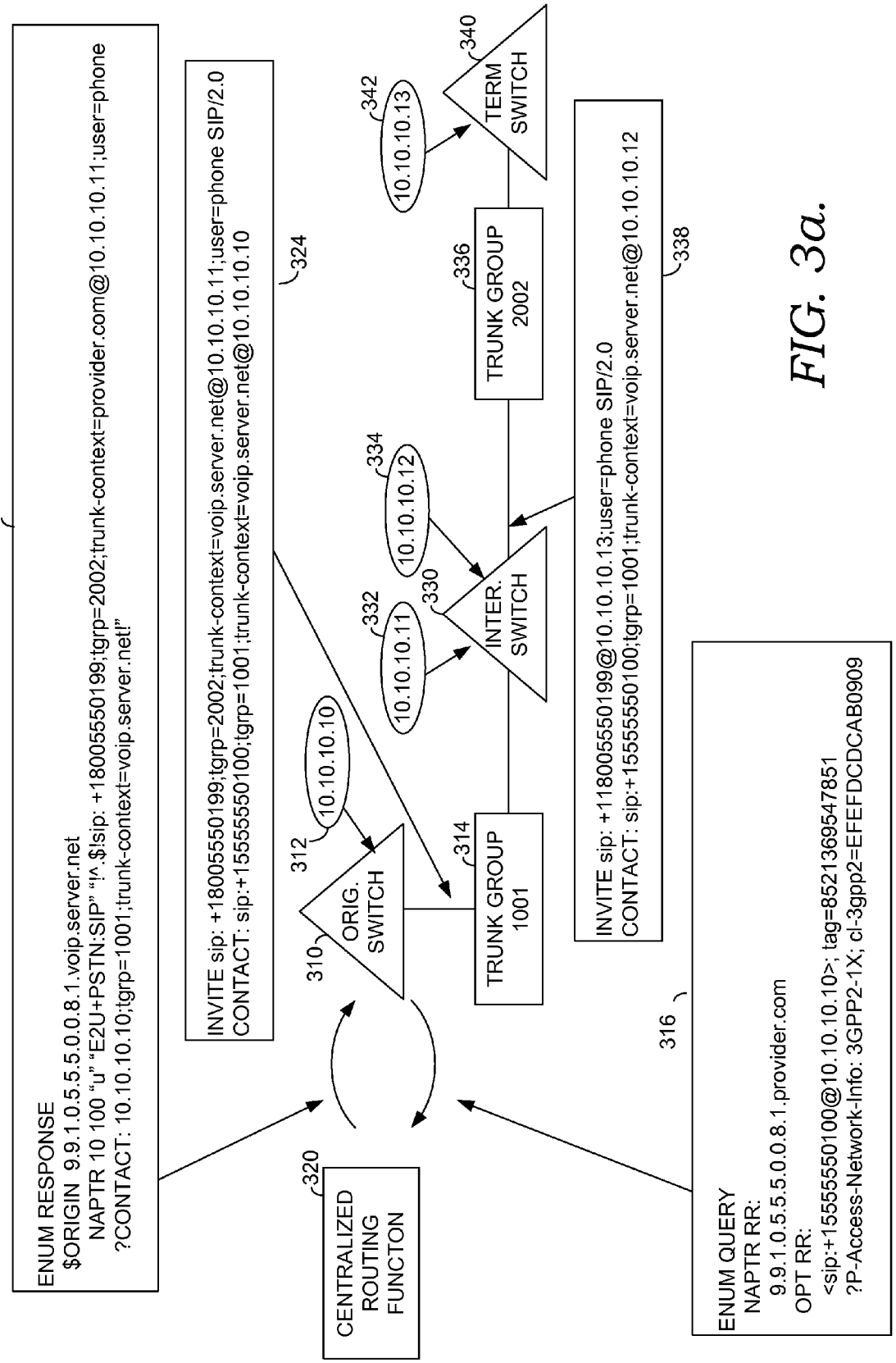
FIG. 3*a* depicts a flow diagram illustrating a method for routing calls from a mobile device based on a converted telephone number of the mobile device, location information of the mobile device, and trunk group identifiers, in accordance with an embodiment of the present invention.
Figure 3B:
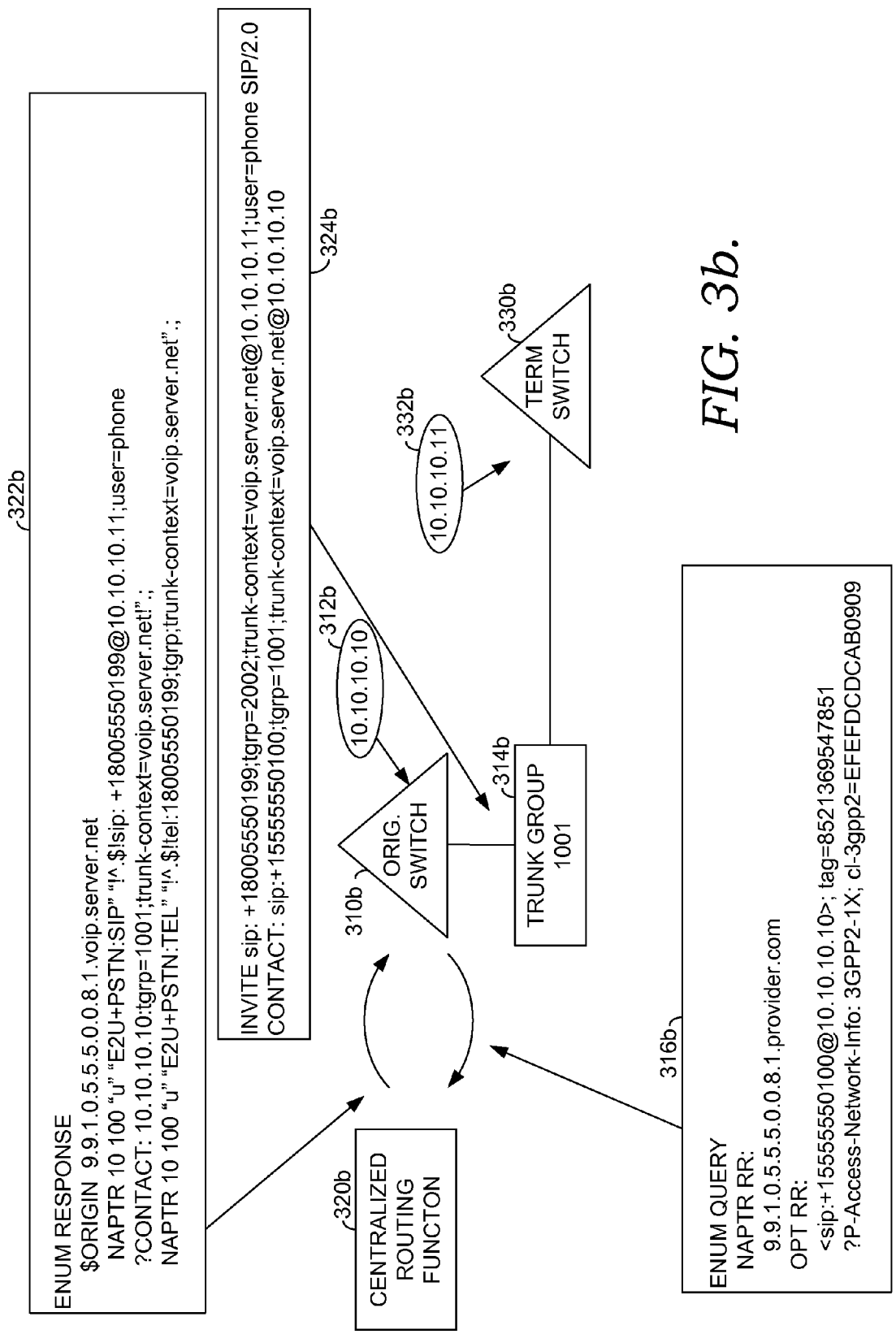
FIG. 3*b* depicts a flow diagram illustrating a method for routing calls from a mobile device based on a converted telephone number of the mobile device, location information of the mobile device, and trunk group identifiers, in accordance with an embodiment of the present invention.

Turning now to FIGS. 3a and 3b, both depicting flow diagrams illustrating a method for routing calls from a mobile device based on a converted telephone number of the mobile device, location information of the mobile device, and trunk group identifiers. By way of illustration only, FIG. 3a depicts a query 316 (e.g., ENUM NAPTR RR and OPT RR) and a response 322 (e.g., NAPTR RR with Originating and Terminating SIP URI trunk group identifiers). Also by way of illustration, FIG. 3b depicts a query 316b (e.g., ENUM NAPTR RR and OPT RR) and a response 322b (e.g., NAPTR RR Originating SIP and TEL URI trunk group identifiers).

With reference to FIG. 3a, the originating switch 310 generates a query 316 requesting one or more routes for a mobile device call. The originating switch has an IP address, 10.10.10.10 312 and an egress trunk group, trunk group 1001, discussed below. The query 316 may be a NAPTR RR query using converted telephone numbers. Telephone numbers are converted to a DNS FQDN from ITU E.164 format using conversion protocols. In an exemplary protocol, an E.164 phone number (e.g., +18005550199) is stripped, the order of the digits reversed and separated by period symbols, and prefixed to a subdomain and top-level domain name (e.g., 9.9.1.0.5.5.5.0.0.8.1.voip.server.net). The domain may be a private domain or a public domain (e.g., e164.arpa). The originating switch query 316 with NAPTR RR is not only sufficient to discover the service and IP address associated with an E.164 telephone number; however, with additional location or namespace information about a Calling Party, in a query sent to a centralized routing function (e.g., centralized routing function 320), the centralized routing function 320 can generate more optimized routing responses. In this regard, the NAPTR RR query 316 may be extended to accommodate additional information, for example, adding an OPT RR to the ENUM DNS NAPTR RR query, using an extension protocol to include location information (e.g., CallingParyNumber information found in a SIP "From:" header of a SIP INVITE, and MSCID, cell, and sector location information found in a SIP "P-Access-Network-Info:" header). With reference to FIG. 3b, it is contemplated that in embodiments, the originating switch 310b generates a query (e.g., ENUM query 316b) and sends it to a centralized routing function 320b.

The centralized routing function 320 receives the query 316 requesting one or more routes for a mobile device call, and then generates one or more responses. The response 322 may be an ENUM DNS NAPTR RR response including fields such as: order, preference, service, flags, Regular Expression (RegEx), and replacement. The originating trunk group of the response 322 identifies an egress trunk group (e.g., trunk group 1001 314) of the originating switch 310.

Sample NAPTR RR Response with Originating trunk group identifiers [SIP URI]

$ORIGIN 9.9.1.0.5.5.5.0.0.8.voip.server.net
IN NAPTR 100 10 "u" "E2U+PSTN :SIP"
"! ^ . *$!sip:+18005550199@voip.servername.net; user= phone
?CONTACT: 10.10.1 0.10; tgrp= 1001; trunk-context= voip.server.net! "

In some embodiments, the response 322 may include both an originating trunk group and a terminating trunk group. For example:

Sample NAPTR RR Response with Originating/Terminating trunk group identifiers $ORIGIN 9.9.1.0.5.5.5.0.0.8.voip.server.net
IN NAPTR 100 10 "u" "E2U+PSTN :SIP"
"! ^ . *$!sip:+18005550199; tgrp=2002; trunk-context=
voip.servername.net; user =phone
?CONTACT: 10.10.10.10; tgrp=1001; trunk-context=voip.server.net! "

The terminating trunk groups are used as virtual trunk group identifier information element in the Request URI of an SIP INVITE (e.g., SIP INVITE 324) to specify an egress trunk group (e.g., trunk group 2002 336) to the next hop SIP proxy or tandem softswitch.

With reference to FIG. 3b, the centralized routing function 320b may generate a response 322b that includes an originating trunk group identifier for a TEL URI. For example, the SIP "CONTACT:" header is embedded in a TEL URI of a NAPTR RR response with an "E2U+PSTN:TEL" service identifier.

| Sample NAPTR RR Response with Originating trunk group identifiers [TEL URI] |
|---|
| $ORIGIN 9.9.1.0.5.5.0.0.8.voip.server.net<br>IN NAPTR 100 10 "u" "E2U+PSTN :TEL"<br>"! ^ . *$!tel:+18005550199; tgrp=3003; trunk-context=voip.server.net! " |

In embodiments of the present invention, the originating switch 310 may route calls based on the response 322 from the centralized routing function 320. As discussed above, each response includes a ";tgrp=" and ";trunk-context" user parameters. The originating switch places the ";tgrp=" and ";trunk-context" user parameters in a SIP INVITE 324. For example, the "CONTACT:" header URI represents an originating trunk group, and the SIP INVITE Request (R-URI) represents a terminating trunk group (e.g., trunk group 2002 336). The SIP "CONTACT:" header may be populated with a CallingPartyNumber as user parameters and originating switch IP as host. For example, the originating switch 310 may tag the outgoing SIP INVITE 324 with information elements so that the destination switch (e.g., intermediate switch 330 or terminal switch 340) can identify which virtual trunk group a call arrived on (e.g., IP 10.10.10.10 312).

With continued reference to FIG. 3a, the SIP INVITE 324 may include both originating and terminating trunk group identifiers. Originating switch 310 may use the terminating trunk group as a virtual trunk group identifier information element in the Request URI of an in INVITE to specify an egress trunk group 2002 336 to the next-hop (e.g., intermediate switch egress trunk group) SIP proxy or tandem softswitch. By way of illustration:

| Sample SIP INVITE with Originating and Terminating Trunk Groups |
|---|
| INVITE sip:+18005551099; tgrp=2002; trunk-context = voip.server.net! @ 10.10.10.11;<br>user=phone SIP/2.<br>CONTACT: sip :+15555550100; tgrp=1001; trunk-context= voip. server.net!10.10.10.10 " |

Accordingly, the intermediate switch 330 (tandem switch) receives the SIP INVITE 324 from the originating switch 310 at IP address 10.10.10.11. The intermediate switch 330 also has IP address 10.101.10.12 334 and is associated with an egress trunk group 2002 336. Similar to the originating switch 310, the intermediate switch generates an SIP INVITE 338 with information elements and forwards the call to terminal switch 340 via the trunk group 2002 336 to IP address 10.10.10.13 342.

With reference to FIG. 3b, the originating switch 310b may route calls based on a response 332b from the centralized routing function 320b. The originating switch 310b may generate a SIP INVITE 324b, similar to SIP INVITE 324; however, it is contemplated that a response 322b may include only originating trunk group identifiers. For example:

| Sample SIP INVITE with Originating Trunk Groups |
|---|
| INVITE sip:+18005551099@ 10.10.10.11; user=phone SIP/2.0<br>CONTACT: sip:+15555550100; tgrp=1001; trunk-context= voip.server.net!10.10.10.10 " |

In this regard, the SIP INVITE 332b includes information elements such as the IP address 10.10.10.10 312b of the originating switch 310b, the egress trunk group, trunk group 1001 314b, and the IP address 10.10.10.11 332b of the terminal switch. It is important to note that FIG. 3b does not include a next hop tandem switch.

Referring to FIG. 4, a flowchart illustrates a method 400 for routing calls from a mobile device based on a converted telephone number of the mobile device, location information of the mobile device, and trunk group identifiers, in accordance with an embodiment of the present invention. Initially, at step 410, a query requesting one or more routes for a mobile device call is generated. The query includes a converted telephone number of the mobile device and location information of the mobile device. Telephone numbers are converted to a DNS FQDN from ITU E.164 format using conversion protocols. The query may be a NAPTR RR query; the query may also be extended to accommodate additional information (e.g., location information) by adding an OPT RR to the ENUM DNS NAPTR RR query. At step 420, one or more responses are received from a centralized routing function. The one or more responses identify the one or more routes for the mobile device call. Each of the one or more responses comprise an originating trunk group identifier, the originating trunk group identifier includes an egress trunk group. The mobile device call is routed using an egress trunk group of a response from the centralized routing function at step 430.

Referring to FIG. 5, a flowchart illustrates a method 500 for routing calls from a mobile device based on a converted telephone number of the mobile device, location information of the mobile device, and trunk group identifiers, in accordance with an embodiment of the present invention. Initially, at step 510, a query requesting one or more routes for a mobile device call is received. The query includes location or namespace information of the mobile device. A centralized routing function, with location and namespace information of the calling party, uses models of the least cost route for a network, to provide information on how to route calls from the originating switch and optionally from the next hop tandem switch. At step 520, one or more responses are generated. The one or more responses identify the one or more routes for the mobile device call. Each of the one or more responses comprise an originating trunk group identifier, the originating trunk group identifier includes an egress trunk group. The one or more responses are communicated to the originating switch for routing the mobile device call at step 530.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, enable a computing device to perform a method of routing mobile device calls based on a converted telephone number of a mobile device, location information of the mobile device, and trunk group identifiers, the method comprising:
generating a query requesting one or more routes for a mobile device call, the query comprises the converted telephone number of the mobile device and location information of the mobile device;
receiving one or more responses from a centralized routing function identifying, based at least in part on the location information in the query, the one or more routes for the mobile device call, the one or more responses each comprising an originating trunk group identifier, wherein the originating trunk group identifier includes an egress trunk group; and
upon receiving the one or more responses, routing the mobile device call using an egress trunk group of a response from the centralized routing function, wherein routing the mobile device call comprises:
accessing a table of a plurality of trunk groups, wherein the table contains references to a corresponding egress trunk group identifier for each of the plurality of trunk groups; and
identifying within the table of the plurality of trunk groups a matching trunk group, between a trunk group in the table and a trunk group in the response, for routing the mobile device call.

2. The media of claim 1, wherein the converted telephone number is an Electronic Number Mapping ENUM Domain Name Service DNS telephone number which is converted to DNS Fully Qualified Domain Name FQDN from E.164 format.

3. The media of claim 1, wherein the query is an ENUM DNS Name Authority Pointer NAPTR Resource Record (RR) query comprising an OPT RR, the OPT RR comprising location information selected from at least one of the following: a CallingPartyNumber, a Mobile Switching Center Identification (MSCID), a cell location, or a sector location.

4. The media of claim 1, wherein each of the one or more responses further comprises a terminating trunk group identifier, wherein the terminating trunk group identifier comprises an egress trunk group for a next hop tandem switch.

5. The media of claim 4, further comprising:
sending the terminating trunk group identifier to the next hop tandem switch, wherein the terminating trunk group identifier comprises an egress trunk group from the next hop tandem switch.

6. The media of claim 1, wherein the one or more routes comprise SIP and legacy TDM routes.

7. The media of claim 6, wherein the one or more routes are encoded in a URI generated by a Regular Expression replacement as virtual trunk group identifiers.

8. The media of claim 7, wherein SIP based routes are presented using SIP URI and TDM based routes are presented using the SIP URI.

9. The media of claim 1, wherein routing the mobile device call using an egress trunk group of a response from the centralized routing function further comprises:
issuing an alarm and processing another response when no matching trunk group exists between the trunk group in the table and the trunk group in the response; and
forwarding the mobile device call out of the matching trunk group based on NAPTR order and preference identified in the response, when the matching trunk group exists.

10. The media of claim 9, wherein identifying within the table of the plurality of trunk groups the matching trunk group between the trunk group in the table and the trunk group in the response comprises comparing a locally configured trunk-context data object and a trunk-context of an egress trunk group in the response.

11. The media of claim 9, wherein each of the plurality of trunk groups comprises a flag, wherein the flag signals whether to include trunk group information for a next hop switch.

12. The media of claim 11, wherein the trunk group information for the next hop switch comprises user parameters in a SIP "CONTACT:" header.

13. Non-transitory computer-readable media having computer-executable instructions embodied thereon that, when executed, enable a computing device to perform a method of routing mobile device calls based on a converted telephone number of a mobile device, location information of the mobile device, and trunk group identifiers, the method comprising:
receiving a query requesting one or more routes for a mobile device call, the query comprises the converted telephone number of the mobile device and location information of the mobile device;
in response to the query, generating one or more responses identifying, the one or more routes for the mobile device call, the one or more responses each comprising an originating trunk group identifier, wherein the originating trunk group identifier includes an egress trunk group; and
communicating the one or more responses to an originating switch for routing the mobile device call, wherein routing the mobile device call comprises:
accessing a table of a plurality of trunk groups, wherein the table contains references to a corresponding egress trunk group identifier for each of the plurality of trunk groups; and
identifying within the table of the plurality of trunk groups a matching trunk group, between a trunk group in the table and a trunk group in a response, for routing the mobile device call.

14. The media of claim 13, wherein each of the one or more routes in the one or more responses is based on location information of the mobile device.

15. The media of claim 13, wherein each of the one or more routes in the one or more responses is further based on a least cost routing models of a wireless communication network associated with the mobile device.

16. The media of claim 14, wherein the least cost routing models are based at least in part on network trunk audits and rates.

17. The media of claim 13, wherein the one or more routes in the one or more responses further comprise routing from the originating switch to a next hop switch only, or routing from the originating switch to a tandem switch, and a terminal switch.

18. A system for routing mobile device calls based on a converted telephone number of a mobile device, location information of the mobile device, and trunk group identifiers, the system comprising:
an originating switch configured for:
generating a query requesting one or more routes for a mobile device call, the query comprises the converted telephone number of the mobile device and location information of the mobile device;

receiving one or more responses identifying, based at least in part on the location information in the query, the one or more routes for the mobile device call, the one or more responses each comprising an originating trunk group identifier, wherein the originating trunk group identifier includes an egress trunk group; and upon receiving the one or more responses, routing the mobile device call using an egress trunk group of a response, wherein routing the mobile device call comprises:

accessing a table of a plurality of trunk groups, wherein the table contains references to a corresponding egress trunk group identifier for each of the plurality of trunk groups; and identifying within the table of the plurality of trunk groups a matching trunk group, between a trunk group in the table and a trunk group in the response, for routing the mobile device call;

a centralized routing function configured for:

receiving the query requesting one or more routes for a mobile device call, the query comprises the converted telephone number of the mobile device and location information of the mobile device;

in response to the query, generating one or more responses identifying, based at least in part on the location information in the query, the one or more routes for the mobile device call, the one or more responses each comprising an originating trunk group identifier, wherein the originating trunk group identifier includes an egress trunk group;

communicating the one or more responses to the originating switch for routing the mobile device call.

19. The system of claim 18, wherein the originating switch is further configured for:

issuing an originating switch alarm and processing another response when no matching trunk group for the originating switch exists between the trunk group in the table and the trunk group in the response; and forwarding the mobile device call out of the matching trunk group based on NAPTR order and preference identified in the response, when the matching trunk group exists.

20. The system of claim 19, further comprising a tandem switch, wherein the tandem switch is configured for:

receiving a request URI with a terminating trunk group from the originating switch, wherein the terminating trunk group identifier comprises an egress trunk group accessing a tandem switch table of a plurality of trunk groups associated with a trunk group in the one or more responses, wherein the table contains references to the tandem switch corresponding egress trunk group identifier for each of the plurality of trunk groups;

identifying within the tandem switch table of the plurality of trunk groups a matching trunk group for the tandem switch between a trunk group in the table and a trunk group in a response;

issuing a tandem switch alarm and using a default process when no matching trunk group for the tandem switch exists between the trunk group in the table and the trunk group in a response; and forwarding the mobile device call out of the matching trunk group based on NAPTR order and preference identified in the response, when the matching trunk group exists.

* * * * *